United States Patent
Chen et al.

(10) Patent No.: US 9,871,724 B2
(45) Date of Patent: Jan. 16, 2018

(54) SYSTEM AND METHOD OF ACTIVE/STANDBY PROTECTION FOR USER-SIDE MULTICAST SERVICES AND ROUTING DEVICE

(75) Inventors: Huihuang Chen, Frankfurt (DE); Guofeng Qian, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 825 days.

(21) Appl. No.: 13/354,131

(22) Filed: Jan. 19, 2012

(65) Prior Publication Data

US 2012/0113799 A1 May 10, 2012

Related U.S. Application Data (63) Continuation of application No. PCT/CN2010/076598, filed on Sep. 3, 2010.

(30) Foreign Application Priority Data

Sep. 3, 2009 (CN) .......................... 2009 1 0170119

(51) Int. Cl.
*H04L 12/703* (2013.01)
*H04L 1/22* (2006.01)
(Continued)

(52) U.S. Cl.
CPC ................ *H04L 45/28* (2013.01); *H04L 1/22* (2013.01); *H04L 45/22* (2013.01); *H04L 45/58* (2013.01); *H04L 2001/0093* (2013.01)

(58) Field of Classification Search
CPC . H04L 2001/0093; H04L 45/22; H04L 45/58; H04L 45/28; H04L 1/22
See application file for complete search history.

(56) References Cited

U.S. PATENT DOCUMENTS

| | | | | |
|---|---|---|---|---|
| 6,148,410 A | * | 11/2000 | Baskey | H04L 41/0654 714/4.11 |
| 7,680,884 B2 | * | 3/2010 | Zhou | H04L 12/185 370/395.31 |

(Continued)

FOREIGN PATENT DOCUMENTS

| | | |
|---|---|---|
| CN | 101420362 A | 4/2009 |
| EP | 2107729 A1 | 10/2009 |

(Continued)

OTHER PUBLICATIONS

Supplementary European Search Report, dated Aug. 21, 2012, in connection with European Patent Application No. 10813359.6, 5 pages.

(Continued)

*Primary Examiner* — Ajay Cattungal (57) ABSTRACT

The present invention relates to a routing device. The routing device and at least one second routing device are both connected to a convergence device. The routing device is an active device and includes a user information synchronizing backup module configured to synchronize multicast service user information to the at least one second routing device in real time through the convergence device. In the present invention, an active routing device and a standby routing device are configured on the user-side, and user information is synchronized to the standby routing device in real time. Therefore, upon active/standby switching, user identification and authentication are not affected, whereby the validity of user traffic and channel is ensured. Furthermore, economic benefits of an operator are guaranteed. Moreover, with the present invention, switching speed is accelerated, service continuity is ensured, and Quality of Experience of a user is improved.

16 Claims, 6 Drawing Sheets

(51) Int. Cl.
*H04L 12/707* (2013.01)
*H04L 12/775* (2013.01)
*H04L 1/00* (2006.01)

(56) References Cited

U.S. PATENT DOCUMENTS

| | | | |
|---|---|---|---|
| 2003/0074554 A1* | 4/2003 | Roach | H04L 63/04 713/153 |
| 2003/0140166 A1* | 7/2003 | Harvey | H04L 45/00 709/238 |
| 2004/0158872 A1* | 8/2004 | Kobayashi | H04L 12/1886 725/120 |
| 2005/0180447 A1* | 8/2005 | Lim | H04L 12/185 370/432 |
| 2005/0213498 A1* | 9/2005 | Appanna | G06F 11/2028 370/216 |
| 2006/0146991 A1* | 7/2006 | Thompson | G06F 9/542 379/67.1 |
| 2008/0186977 A1* | 8/2008 | Nomi | H04L 29/12301 370/395.5 |
| 2008/0232368 A1* | 9/2008 | Ikegami | H04L 12/185 370/390 |
| 2009/0252173 A1* | 10/2009 | Sampath | H04L 45/586 370/400 |
| 2010/0020806 A1* | 1/2010 | Vahdat | H04L 45/00 370/395.31 |

FOREIGN PATENT DOCUMENTS

| | | |
|---|---|---|
| JP | 2003143193 A | 5/2003 |
| JP | 2004242063 A | 8/2004 |
| JP | 2006279375 A | 10/2006 |
| JP | 2008193231 A | 8/2008 |
| JP | 2008544637 A | 12/2008 |
| WO | WO 2005/039129 A1 | 4/2005 |
| WO | WO 2006/135282 2 | 12/2006 |

OTHER PUBLICATIONS

Notice of Reasons for Rejection dated Jul. 30, 2013 in connection with Japanese Patent Application No. 2012-521953.
Written Opinion of the International Searching Authority dated Dec. 16, 2010 in connection with International Patent Application No. PCT/CN2010/076598.
International Search Report dated Dec. 16, 2010 in connection with International Patent Application No. PCT/CN2010/076598.

* cited by examiner

SYSTEM AND METHOD OF ACTIVE/STANDBY PROTECTION FOR USER-SIDE MULTICAST SERVICES AND ROUTING DEVICE

CROSS-REFERENCE TO RELATED APPLICATIONS

This application is a continuation of International Application No. PCT/CN2010/076598, filed on Sep. 3, 2010, which claims priority to Chinese Patent Application No. CN 200910170119.2, filed with the Chinese Patent Office on Sep. 3, 2009 and entitled "SYSTEM AND METHOD OF ACTIVE/STANDBY PROTECTION FOR USER-SIDE MULTICAST SERVICES AND ROUTING DEVICE", both of which are hereby incorporated by reference in their entireties.

TECHNICAL FIELD

The present invention relates to the field of data traffic protection, and in particular, to a system and a method of active/standby protection for user-side multicast services and a routing device.

BACKGROUND

With the popularization of diverse Internet Protocol Television (Internet Protocol Television, IPTV) services, the data traffic protection switching mechanism of the backbone network has been mature. However, in case that a link of an edge router on the user-side fails, no effective data traffic protection mechanism of multicast services is available currently.

Data traffic protection schemes for multicast services have been put forward in the prior art, for example, multicast source active/standby protection. In the multicast source active/standby protection scheme, a multicast proxy server is connected to a multicast-source active server and a multicast-source standby server respectively. The multicast proxy server internally provides a collaboration interface for the multicast-source active server and the multicast-source standby server, and externally converts source address of data stream of the multicast source into the same external network address and forwards the data stream of the multicast source. A multicast source backup switching control protocol is run between the multicast proxy server and the multicast-source active server/multicast-source standby server to implement active/standby protection for the multicast source. Such a multicast-source active/standby protection scheme mainly aims at overcoming instability of the multicast source in the related art, but is difficult to be applied to a receiving end on the user-side.

A multicast static group backup scheme is also put forward in the related art. In this scheme, multicast static group information is configured in the interface of an active router on the network side, and a hot channel is introduced into the active router, and is backed up manually on a standby router. Because such a scheme requires manual configuration, it is impossible to dynamically back up multicast program information demanded by a user. Furthermore, because no user information is backed up in the standby router, it is impossible to identify or authenticate the user, it is difficult to protect benefits of an operator.

It can be seen that the data traffic protection schemes in the prior art cannot be simply applied to user-side data traffic protection due to their own disadvantages. In the case of absence of protection, in case that the user-side multicast active router fails, multicast traffic is interrupted. The user cannot again join a channel corresponding to the multicast traffic by sending a report packet until the next Internet Group Management Protocol (Internet Group Management Protocol, IGMP) query is initiated, thereby deteriorating the Quality of Experience of the user.

SUMMARY

Embodiments of the present invention provide a system and a method of active/standby protection for user-side multicast services and a routing device to implement active/standby protection for data traffic of user-side multicast services.

To achieve the foregoing objectives, an embodiment of the present invention provides a routing device. The routing device and at least one second routing device are both connected to a convergence device. The routing device is an active device and includes a user information synchronizing backup module, configured to synchronize multicast service user information to the at least one second routing device in real time through the convergence device.

To achieve the foregoing objectives, an embodiment of the present invention provides a routing device. The routing device and a first routing device are both connected to a convergence device, where the first routing device is an active device. The routing device includes:
  a user information synchronizing storage module, configured to store multicast service user information synchronized from the first routing device in real time; and
  an active/standby switching module, configured to select a second active device to replace the first routing device when detecting that a state of the first routing device is changed from available to unavailable.

To achieve the foregoing objectives, an embodiment of the present invention provides a system of active/standby protection for user-side multicast services. The system includes a first routing device and at least one second routing device. The first routing device and the at least one second routing device are both connected to a convergence device. The first routing device is configured to synchronize multicast service user information to the at least one second routing device in real time through the convergence device. The at least one second routing device is configured to select a second active device to replace the first routing device when detecting that a state of the first routing device is changed from available to unavailable.

To achieve the foregoing objectives, an embodiment of the present invention provides a method of active/standby protection for user-side multicast services. In the method, a first routing device and at least one second routing device are both connected to a convergence device, and the first routing device is an active device. The method includes:
  synchronizing, by the first routing device, multicast service user information to the at least one second routing device in real time through the convergence device; and
  selecting, by the at least one second routing device, a second active device among the at least one second routing device to replace the first routing device when detecting that a state of the first routing device is changed from available to unavailable.

Based on the foregoing technical solution, in the present invention, an active routing device and a standby routing device are configured on the user-side, and user information is synchronized to the standby routing device in real time. Therefore, upon active/standby switching, user identification and authentication are not affected, whereby the validity of user traffic and channel is ensured. Furthermore, economic benefits of an operator are guaranteed. Moreover, with the present invention, switching speed is accelerated, service continuity is ensured, and Quality of Experience of the user is improved.

BRIEF DESCRIPTION OF THE DRAWINGS

Accompanying drawings illustrated below are intended to provide further understanding of the present invention and constitute part of this application. The exemplary embodiments of the present invention and description thereof are used to explain the present invention, and shall not be construed as limitation on the present invention. In the accompanying drawings.

DETAILED DESCRIPTION

The technical solution of the present invention is further described in detail below with reference to accompanying drawings and embodiments.

Figure 1:
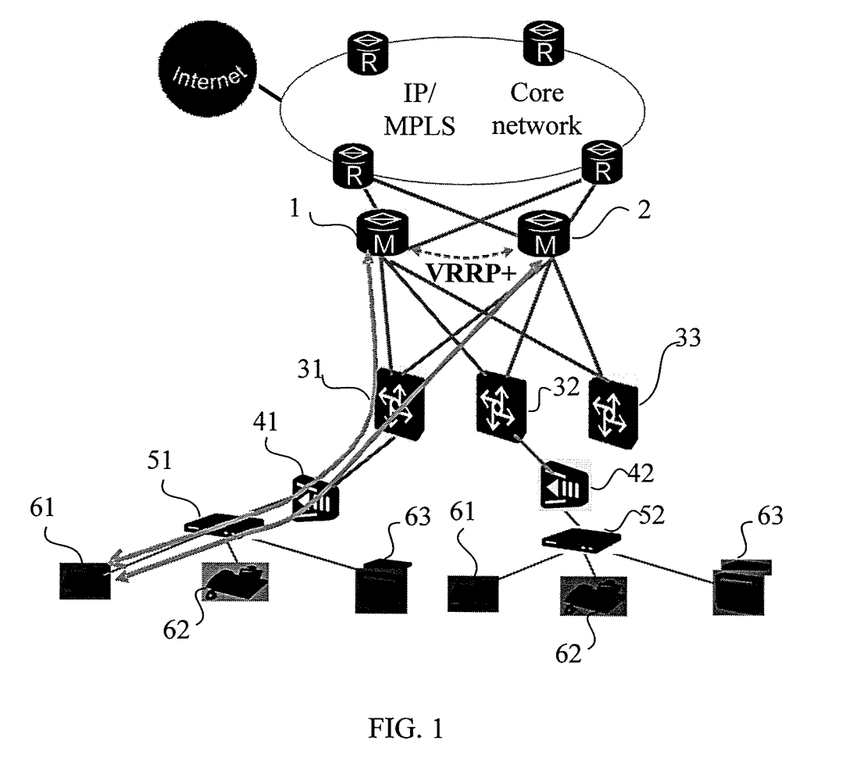
FIG. 1 is an application scenario diagram of a system of active/standby protection for user-side multicast services according to an embodiment of the present invention.

FIG. 1 is an application scenario diagram of a system of active/standby protection for user-side multicast services according to an embodiment of the present invention. In this embodiment, a user-side includes a first routing device serving as an active device (such as Broadcast Remote Access Server (Broadcast Remote Access Server, BRAS-1)) and at least one second routing device serving as a standby device (such as BRAS-2). FIG. 1 only schematically shows one second routing device (BRAS-2). In other application scenarios, more standby routing devices may be included, for example, BRAS-3, BRAS-4, etc.

In uplink, the first routing device BRAS-1 and the second routing device BRAS-2 are both connected to a routing device in IP/MPLS core network. In downlink, they are both connected to a convergence device 31, a convergence device 32, or a convergence device 33 on the user-side. In this scenario, a convergence device is a Core Switch (Core Switch, CSW). The Core Switch CSW-31, in the downlink, is connected to those corresponding devices such as Digital Subscriber Line Access Multiplexer (Digital Subscriber Line Access Multiplexer, DSLAM) 41, etc. The CSW-32, in the downlink, is connected to a DSLAM-42. A Set Top Box (Set Top Box, STB) 63, a phone Phone-62, and a Personal Computer PC-61 may all be connected to Digital Subscriber Line Access Multiplexer DSLAM-41 through a Home Gateway (Home Gateway, HG) 51. The STB-63, the phone Phone-62, and the Personal Computer PC-61 may demand multicast channel information through PPPoE dial-up access, or demand the multicast channel information by accessing the Internet through a Dynamic Host Configuration Protocol (Dynamic Host Configuration Protocol, DHCP).

When a user demands multicast channel information through the user-side devices (Set Top Box STB-63, phone Phone-62, PC-61, etc.), a network side needs to identify and authenticate the user. Therefore, the multicast service user information needs to be stored in the second routing device BRAS-2.

Figure 2:
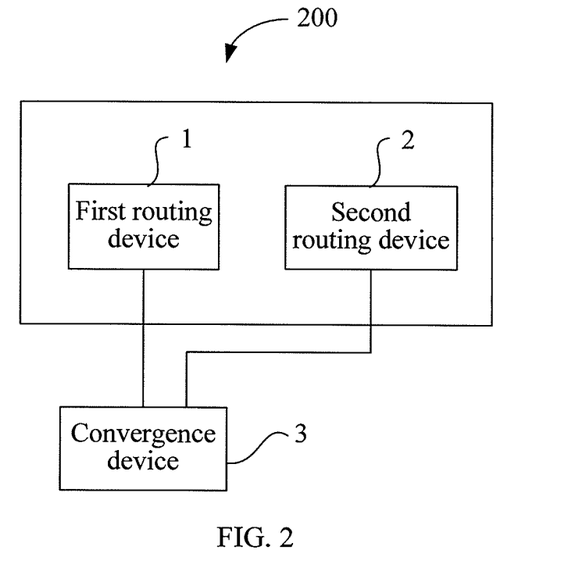
FIG. 2 is a schematic structural diagram of a system of active/standby protection for user-side multicast services according to an embodiment of the present invention.

FIG. 2 is a schematic structural diagram of a system of active/standby protection for user-side multicast services according to an embodiment of the present invention. In this embodiment, a system 200 of active/standby protection of user-side multicast services (rectangular box indicated by arrow) includes a first routing device 1 and at least one second routing device 2 (in FIG. 2, one second routing device is illustrated as an example). The first routing device 1 and the at least one second routing device 2 are both connected to a convergence device 3 (corresponding to the CSW-31, the CSW-2, or the CSW-33 in FIG. 1), where the convergence device 3 may be CSW-31, CSW-2, or CSW-33, etc. in FIG. 1. The first routing device 1 is configured to synchronize multicast service user information to the at least one second routing device 2 in real time through the convergence device 3. The at least one second routing device 2 is configured to select a second active device to replace the first routing device 1 after detecting that a state of the first routing device 1 is changed from available to unavailable.

Figure 3:
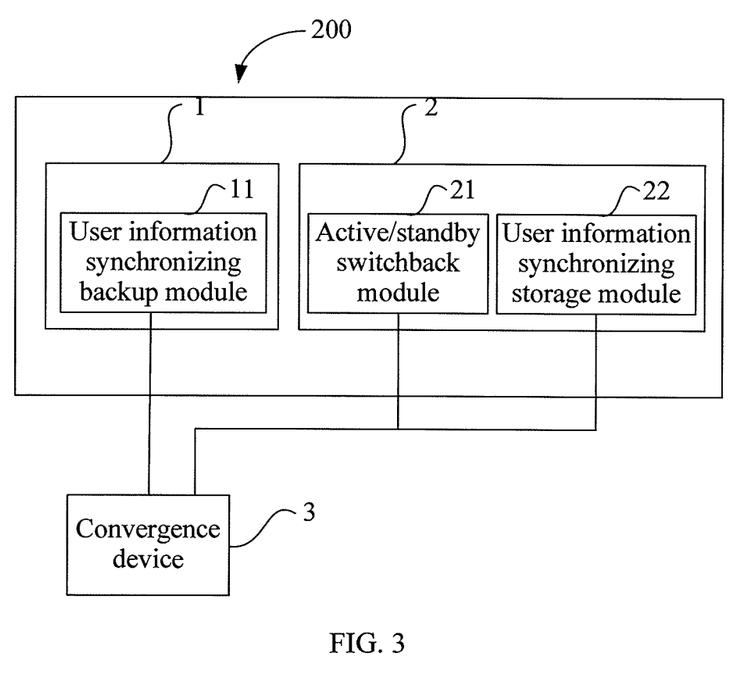
FIG. 3 is a schematic structural diagram of a system of active/standby protection for user-side multicast services according to another embodiment of the present invention, where the system embodiment includes specific structures of embodiments of a first routing device and a second routing device.

FIG. 3 is a schematic structural diagram of a system of active/standby protection for user-side multicast services according to another embodiment of the present invention, where the system embodiment includes specific structures of embodiments of a first routing device 1 and a second routing device 2. In FIG. 3, the first routing device 1 is the active device, and may include a user information synchronizing backup module 11 configured to synchronize multicast service user information to the second routing device 2 in real time through the convergence device. In this way, it may be ensured that the second routing device 2 all the way receives and saves the user information of the multicast service running on the first routing device 1. Therefore, upon active/standby switching, the second routing device 2 is able to identify and authenticate the user according to the multicast service user information without interrupting, by the second routing device 2, the accessed multicast service, and keeps on serving the user according to the multicast service user information. As for scenario that multiple second routing devices 2 exist, a mode of synchronizing backup is N+1 backup, where N is a natural number.

The real-time synchronization function of the first routing device 1 indicates that the first routing device 1 can synchronize the updated multicast service user information to the second routing device 2 in time according to the update state of the multicast service user information stored therein in order that when the state of the first routing device 1 is changed from available to unavailable, the second routing device 2 can ensure that there will not be interruption of the multicast service caused by change in the user information, and the user identification and authentication can also be implemented.

In FIG. 3, the second routing device 2 may include a user information synchronizing storage module 22 and an active/standby switching module 21. The user information synchronizing storage module 22 is configured to store the multicast service user information synchronized from the first routing device 1 in real time. The active/standby switching module 21 may implement fault detection and active/standby switching between the first routing device 1 and the second routing device 2 through an existing active/standby switching protocol, e.g. Virtual Router Redundancy Protocol (Virtual Router Redundancy Protocol, VRRP) etc. In the VRRP protocol, the first routing device 1 communicates with the at least one second routing device 2 by sending a VRRP multicast packet at designated time, to ensure that the second routing device 2 is informed of the state of the first routing device 1 in time. The active/standby switching module 21 included in the second routing device 2 periodically checks whether an advertisement (advertisement) packet is received from the first routing device 1. If no advertisement packet is received, it can be determined that the state of the first routing device 1 has been changed from available to unavailable. At this time, a second active device among the at least one second routing device 2 is selected to replace the first routing device 1. The second active device keeps on providing multicast services for the user. Meanwhile, the first routing device 1 is switched into a standby state, and a free Address Resolution Protocol (Address Resolution Protocol, ARP) is published to update a Media Access Control (Media Access Control, MAC) table of the convergence device 3 in downlink.

In another embodiment, the first routing device may further include an active/standby switchback module. After the first routing device recovers the available state from the unavailable state, the second active device and the first routing device carry on active/standby negotiation again. If a result of the negotiation is that the first routing device serves as an active device, the active/standby switchback module switches the first routing device into the active state, switches the second active device to the standby state, and publishes the free ARP to complete the switchback of the user service. In another embodiment, to ensure service continuity, the second routing device may further include a user information batch backup module. The second active device backs up the multicast service user information to the first routing device in batches when the first routing device is switched to the active state.

The multicast service user information described above refers to user-side information related to the accessed multicast service. For example, the multicast service user information includes at least MAC address of the user, and may further include the user-side multicast information such as statistic mode of multicast traffic of the user, multicast group authorization list, etc.

Taking the switching speed of the existing active/standby switching protocol into consideration, the present invention further provides an embodiment for realizing a higher switching speed, that is, a Bidirectional Forwarding Detection (Bidirectional Forwarding Detection, BFD) module may also be set in another embodiment of the second routing device. The BFD module may establish a Bidirectional Forwarding Detection session (BFD session, BFD session) between the first routing device and the at least one second routing device, and detect whether the BFD session is in the Down state. If detecting that the BFD session is in the down state, it is determined that the state of the first routing device is changed from available to unavailable. When it is determined that the state of the first routing device is changed from available to unavailable, the second routing device may, through an active/standby switching module, use an existing active/standby switching protocol (e.g. VRRP protocol) to complete the active/standby switching.

After the active/standby switching, detecting whether the BFD session established between the first routing device and the second active device is in the Up state. If detecting that the BFD session between the first routing device and the second active device is in the Up state, it is determined that the first routing device recovers the available state from the unavailable state. When determining that the first routing device recovers the available state from the unavailable state, the second active device may use the existing active/standby switching protocol (e.g. VRRP protocol) to carry on active/standby negotiation with the first routing device again. If the result of the negotiation is that the first routing device serves as an active device, the active/standby switchback module switches the first routing device to the active state, and the second active device to the standby state.

The BFD protocol is a path connectivity detection protocol. BFD aims at providing fault detection applied between adjacent forwarding systems with low overhead and short detection time. As a payload, a BFD packet is encapsulated through UDP protocol, and by using destination UDP port number 2784, it can be loaded into any proper media or network protocol. The BFD may be run on multiple layers of the system. To meet the requirement of rapid detection, the BFD draft designates microsecond (microsecond) as the unit of sending interval and receiving interval. However, in view of the current processing capabilities of devices, the time spent on configuring BFD in the devices of most manufacturers is no shorter than millisecond (millisecond) level, which is converted into microsecond at the time of internal processing. The default timer is 10 ms. Three consecutive failure can be detected, thereby the shortest time of 30 ms detecting link faulty being achieved. The BFD state mechanism is implemented by means of three handshakes. BFD state machine is both established and removed through three-handshake mechanism, so that it can be ensured that the systems on both sides are informed of changes in the state.

For example, a BFD session can be created, deleted and modified as long as the destination address and other parameters are available. When the BFD session is in Up or Down state, a signal is returned to the system in order to perform corresponding processing.

A BFD session includes four states: Down, Init, Up, and AdminDown. "Down" indicates that the session is in Down state or just established. "Init" indicates that the local side has already been capable of communicating with a peer system and expects the session to enter the Up state. "Up" indicates that the session has been established successfully. "AdminDown" indicates that the session is in the administrative Down state.

Through the above illustration of the BFD protocol, it is appreciated that the time spent in rapidly detecting whether the first routing device is changed from the available state to the unavailable state is in millisecond level (e.g. 100-200 ms) by this protocol. The BFD protocol is also is applied to fast switching of a Protocol Independent Multicast (Protocol Independent Multicast, PIM) interface on the routing device. When it is detected that the state of the BFD session between the first routing device and the second routing device is Down, the PIM interface reselects a Designated Router (Designated Router, DR) and selects a new path to forward data.

In this embodiment, the active/standby switching module of the second routing device is connected to the BFD module, and may perform active/standby switching according to the unavailable state detected by the BFD module. Because the time spent in detecting the unavailable state of the first routing device is as short as 100-200 ms, fast switching may be implemented between the first routing device and the second routing device, thus the continuity of the multicast service is ensured. The switching time is so short that the user generally is unaware of abnormality of the network. Furthermore, since the multicast service user information is backed up in real time, the user is unnecessary to log in or demand the service again. Thus, not only availability of the multicast service and satisfaction of a multicast user are improved, but also economic benefits of the operator are guaranteed.

Figure 4:
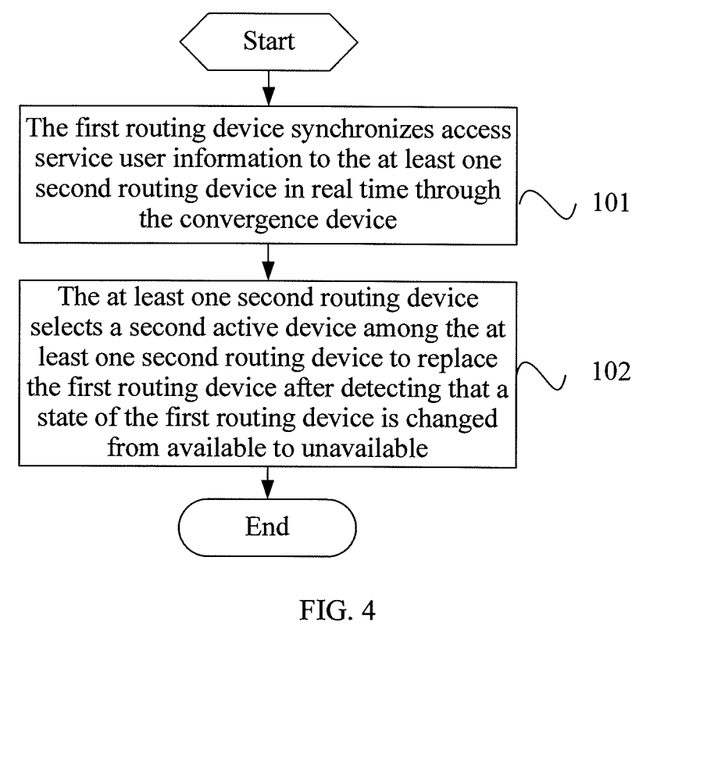
FIG. 4 is a schematic flowchart of a method of active/standby protection for user-side multicast services according to an embodiment of the present invention.

FIG. 4 is a schematic flowchart of a method of active/standby protection for user-side multicast services according to an embodiment of the present invention. In this embodiment, a first routing device and at least one second routing device are both connected to a convergence device. The first routing device is network architecture of an active device. The process of active/standby protection for user-side multicast services includes the following steps:

Step 101: The first routing device synchronizes multicast service user information to the at least one second routing device in real time through the convergence device.

Step 102: The at least one second routing device selects a second active device among the at least one second routing device to replace the first routing device, when detecting that a state of the first routing device is changed from available to unavailable.

In this embodiment, the first routing device is changed from the available state to the unavailable state due to failure of a link, an interface, or a board of the first routing device or failure of the whole device. In step 102, after completion of the active/standby switching, the second active device needs to identify the received IGMP packet of the user, and sends it to an IGMP protocol layer. Because the multicast service user information has already been backed up on the second active device, the IGMP report packet of the user may pass the user authentication. Therefore, an IGMP table entry of the user is created, and the multicast traffic is routed to the second active device.

In this embodiment, the first routing device synchronizes the multicast service user information to the second routing device in real time. Therefore, it is ensure that the second routing device always stores accurate user information. Thus, the network side may identify and authenticate the user accurately to guarantee the benefits of the operator, and ensure quick recovery of the service while switching to prevent interruption of the multicast service of the user, thereby offering the pleasant Quality of Experience of the user.

Figure 5:
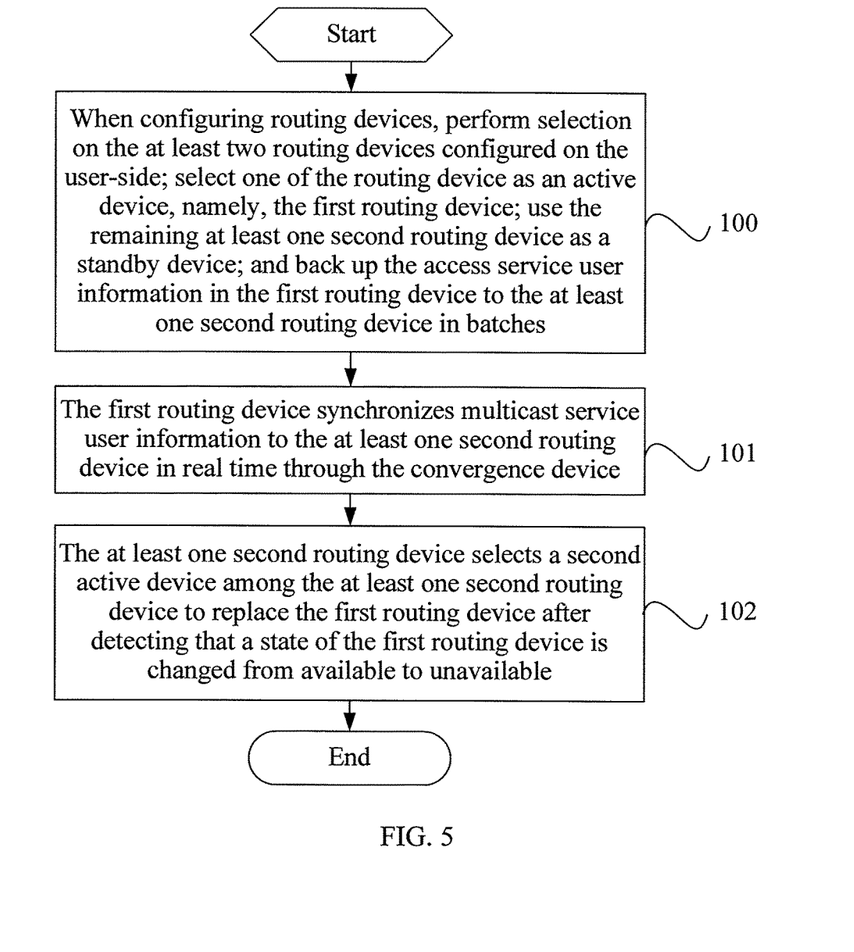
FIG. 5 is a schematic flowchart of a method of active/standby protection for user-side multicast services according to another embodiment of the present invention.

FIG. 5 is a schematic flowchart of a method of active/standby protection for user-side multicast services according to another embodiment of the present invention. Compared with the immediately preceding embodiment, this embodiment further includes step 100: When at least two routing devices are configured on the user-side, selection may be performed on the at least two routing devices configured on the user-side through an active/standby switching protocol (e.g. VRRP). A first routing device is selected as an active device, the remaining at least one second routing device serves as a standby device. And the multicast service user information in the first routing device is backed up to the at least one second routing device in batches. Through the batch backup, the multicast service user information on the second routing device can be backed up rapidly. On the basis of the batch backup, in step 101, the first routing device continuously updates the multicast service user information according to the login/logout of the user, and notifies every second routing device in real time. Step 102 is similar to step 102 in FIG. 4, and is not repeatedly described here.

Figure 6:
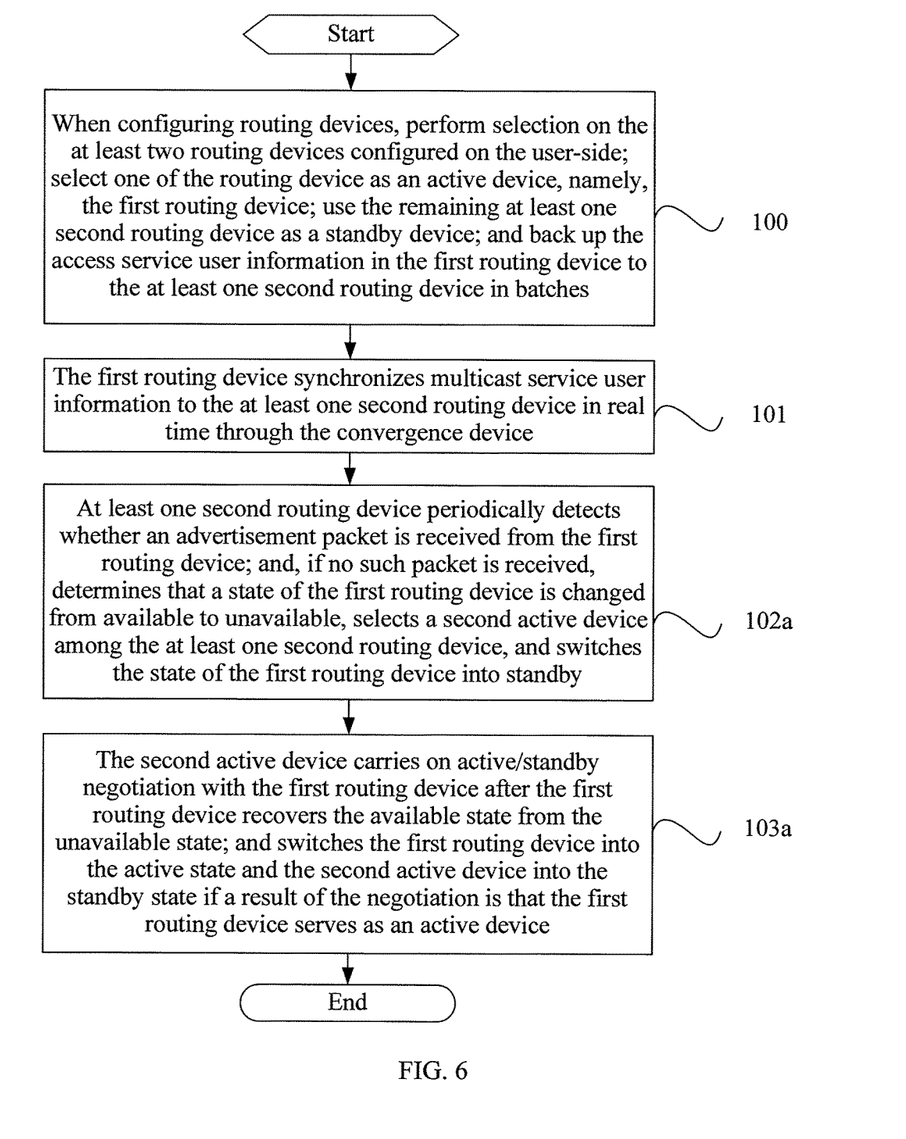
FIG. 6 is a schematic flowchart of a method of active/standby protection for user-side multicast services according to yet another embodiment of the present invention.

FIG. 6 is a schematic flowchart of a method of active/standby protection for user-side multicast services according to yet another embodiment of the present invention. Compared with the immediately preceding embodiment, step 102 in this embodiment is embodied as step 102a, that is, at least one second routing device periodically detects whether an advertisement packet (e.g. VRRP multicast packet, etc.) is received from the first routing device. If no such packet is received, it is determined that the state of the first routing device is changed from available to unavailable. At this time, the second active device is selected among the at least one second routing device, and the state of the first routing device is switched to standby.

After step 102a, for example, step 103a may be further included, that is, after the first routing device recovers the available state from the unavailable state, the second active device carries on active/standby negotiation with the first routing device. If a result of the negotiation is that the first routing device serves as an active device, the first routing device is switched to the active state, and the second active device is switched to the standby state. While changing the first routing device into the active state, the second active device may also back up the multicast service user information to the first routing device in batches.

In step 102a of this embodiment, when at least one second routing device detects that the state of the first routing device is changed from available to unavailable, the at least one second routing device may also reselect a PIM interface to select a new data forwarding path.

Figure 7:
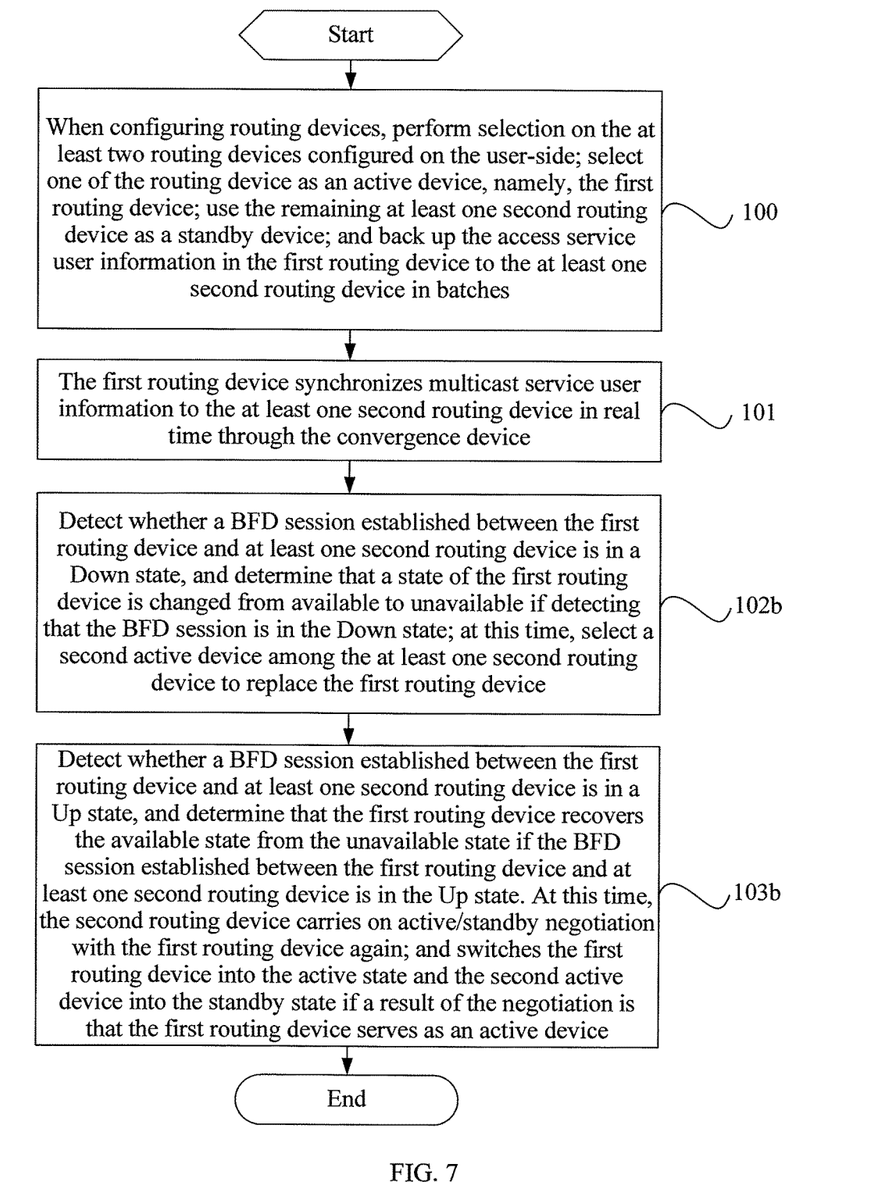
FIG. 7 is a schematic flowchart of a method of active/standby protection for user-side multicast services according to still another embodiment of the present invention.

FIG. 7 is a schematic flowchart of a method of active/standby protection for user-side multicast services according to still another embodiment of the present invention. Compared with the immediately preceding embodiment, this embodiment differs from the immediately preceding embodiment in steps 102b-103b. In step 102b and 103b, a BFD protocol is used to perform fault detection and fallback detection, as detailed below:

Step 102b: Detect whether the BFD session established between the first routing device and at least one second routing device is in the Down state. It is determined that the state of the first routing device is changed from available to unavailable if detecting that the BFD session is in the Down state. While determining that the state of the first routing device is changed from available to unavailable, the second routing device may, through an active/standby switching module, use an existing active/standby switching protocol (e.g. VRRP protocol) to select a second active device among the at least one second routing device to replace the first routing device.

Step 103b: Detect whether the BFD session established between the first routing device and at least one second routing device is in the Up state. It is determined that the first routing device recovers the available state from the unavailable state if detecting that the BFD session established between the first routing device and the second active device is in the Up state. The second routing device may use the existing active/standby switching protocol (e.g. VRRP protocol) to carry on active/standby negotiation with the first routing device again. If a result of the negotiation is that the first routing device serves as an active device, the active/standby switchback module switches the first routing device into the active state, and switches the second active device into the standby state. While switching the first routing device to the active state, the second active device may also back up the multicast service user information to the first routing device in batches.

In this embodiment, by using the characteristic of BFD protocol rapidly detecting faults, the second routing device on the user-side can, in time, detect that the first routing device is changed from the available state to the unavailable state. Since the detection time is as short as 100-200 ms, the switching time is improved, thereby ensuring the continuity of the multicast service. The switching time is so short that the user generally is unaware of abnormality of the network. Furthermore, since the multicast service user information is backed up in real time, the user is unnecessary to log in or demand the service again. Thus, not only availability of the multicast service and satisfaction of a multicast user are improved, but also economic benefits of the operator are guaranteed.

In step 102*b* of this embodiment, while detecting that the BFD session established between the first routing device and the second active device is in the Down state, the at least one second routing device may also reselect a PIM interface to select a new data forwarding path.

It is understood by persons of ordinary skill in the art that all or part of the steps of the method according to the embodiments of the present invention may be implemented by a program instruction relevant hardware. The foregoing program may be stored in a computer readable storage medium. When the program is run, it performs the steps of the method according to the embodiments of the present invention. The foregoing storage media include any medium capable of storing program codes, such as ROM, RAM, a magnetic disk, a compact disk and so on.

Finally, it is noted that the above embodiments are intended to merely illustrate the technical solution of the present invention, rather than limit it. Although the present invention is illustrated in detail with reference to exemplary embodiments, it is understood by persons of ordinary skill in the art that modification in the specific detailed description according to the present invention or equivalent substitution for partial technical features may still be made. Those modification and substitution shall be encompassed by the scope of the technical solution claimed by the present invention.

What is claimed is:

1. A routing device, comprising:
   a processor; and
   a memory coupled to the processor, the memory including instructions that, when executed by the processor, cause the processor to:
   synchronize multicast service user information from the routing device to at least one second routing device in real time through a convergence device, wherein the routing device is an active device, wherein the multicast service user information is used for identifying and authenticating a user, both the routing device and the at least one second routing device are converged to the convergence device.

2. The routing device according to claim 1, further comprising instructions that, when executed by the processor, cause the processor to:
   perform switchback negotiation with a second active device after the routing device recovers an available state from an unavailable state, wherein the second active device is selected among the at least one second routing device when the routing device is unavailable; and
   switch the routing device into an active state and the second active routing device into a standby state if a result of the negotiation is that the routing device serves as a third active device.

3. A routing device, comprising:
   a processor; and
   a memory coupled to the processor, the memory including instructions that, when executed by the processor, cause the processor to:
   store multicast service user information synchronized from a second routing device through a convergence device in real time, wherein the multicast service user information is used for identifying and authenticating a user, both the second routing device and the routing device are converged to the convergence device, the second routing device is connected to a first interface of the convergence device and the routing device is connected to a second interface of the convergence device; and
   select a device to replace the second routing device when detecting that a state of the second routing device is changed from available to unavailable.

4. The routing device according to claim 3, further comprising instructions that, when executed by the processor, cause the processor to:
   back up the multicast service user information to the second routing device in batches when the second routing device recovers an active state.

5. The routing device according to claim 3, further comprising instructions that, when executed by the processor, cause the processor to:
   establish a Bidirectional Forwarding Detection session between the routing device and the second routing device;
   detect whether the Bidirectional Forwarding Detection session is in a Down state; and
   determine that a state of the second routing device is changed from available to unavailable if detecting that the Bidirectional Forwarding Detection session is in the Down state.

6. The routing device according to claim 3, further comprising instructions that, when executed by the processor, cause the processor to: select the device to replace the second routing device by itself or together with at least another routing device.

7. A system of protection for user-side multicast services, the system comprising:
   a first routing device and a second routing device, wherein both the first routing device and the second routing device are converged to a convergence device, the first routing device is connected to a first interface of the convergence device and the second routing device is connected to a second interface of the convergence device;
   the first routing device is configured to synchronize multicast service user information to the second routing device in real time through the convergence device, wherein the multicast service user information is used for identifying and authenticating a user, and the second routing device is configured to select a device to replace the first routing device when detecting that a state of the first routing device is changed from available to unavailable.

8. A method of protection for user-side multicast services, the method comprising:
- receiving, by a routing device, multicast service user information synchronized by a first routing device through a convergence device, wherein the multicast service user information is used for identifying and authenticating a user, both the first routing device and the routing device are converged to the convergence device, the first routing device is connected to a first interface of the convergence device and the routing device is connected to a second interface of the convergence device; and
- selecting, by the routing device, a device to replace the first routing device when detecting that a state of the first routing device is changed from available to unavailable.

9. The method according to claim 8, further comprising:
- carrying on, by the selected device, a negotiation with the first routing device after the first routing device recovers an available state from an unavailable state; and
- switching the first routing device into an active state and the selected device into a standby state if a result of the negotiation is that the first routing device serves as an active device.

10. The method according to claim 9, further comprising:
- backing up, by the selected device, the multicast service user information to the first routing device in batches when switching the first routing device into the active state.

11. The method according to claim 8, further comprising:
- detecting periodically, by the routing device, whether an advertisement packet is received from the first routing device; and
- determining that the state of the first routing device is changed from available to unavailable if no advertisement packet is received.

12. The method according to claim 8, further comprising:
- detecting whether a bidirectional forwarding detection session established between the first routing device and the routing device is in a Down state; and
- determining that the state of the first routing device is changed from available to unavailable if detecting that the Bidirectional Forwarding Detection session is in the Down state.

13. The method according to claim 12, further comprising:
- detecting whether a Bidirectional Forwarding Detection session established between the first routing device and the selected device is in an Up state; and
- determining that the first routing device recovers the available state from the unavailable state if detecting that the Bidirectional Forwarding Detection session established between the first routing device and the selected device is in the Up state.

14. The method according to claim 12, further comprising:
- reselecting, by the routing device, a Protocol Independent Multicast interface and selecting a new data forwarding path when judging that the state of the first routing device is changed from available to unavailable.

15. The method according to claim 8, wherein the multicast service user information comprises a Media Access Control MAC address of a user.

16. The method according to claim 8, wherein the device for replacing the second routing device is selected by the routing device itself or by the routing device together with at least another routing device.

* * * * *